June 26, 1923.                                            1,460,024
KARL PRINZ ZU LÖWENSTEIN
APPARATUS FOR THE SEMICOKING OF COAL, SLATE, OR OTHER BITUMINOUS SUBSTANCES
Filed Aug. 22, 1921
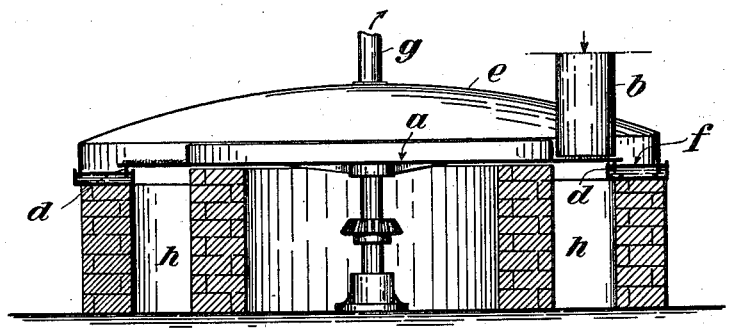
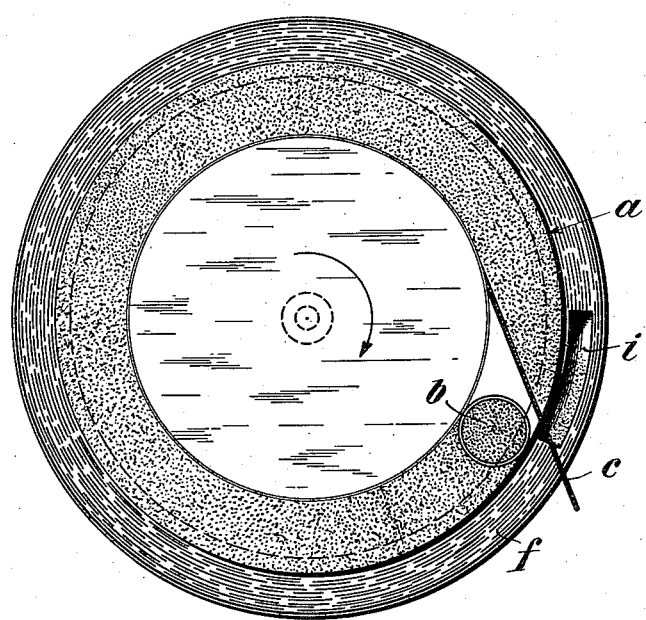
INVENTOR.
Karl Prinz zu Löwenstein
By William C. Linton
Atty.

Patented June 26, 1923.

1,460,024

UNITED STATES PATENT OFFICE.

KARL PRINZ ZU LÖWENSTEIN, OF BERLIN, GERMANY.

APPARATUS FOR THE SEMICOKING OF COAL, SLATE, OR OTHER BITUMINOUS SUBSTANCES.

Application filed August 22, 1921. Serial No. 494,213.

*To all whom it may concern:*

Be it known that I, KARL PRINZ ZU LÖWENSTEIN, citizen of the German Republic, and residing at No. 11 Lutzow-Ufer, in the city of Berlin, in the Republic of Germany, have invented certain new and useful Improvements in Apparatus for the Semicoking of Coal, Slate, or Other Bituminous Substances, of which the following is a specification.

This invention relates to the semi-coking of coal, slate, and other bituminous substances and consists chiefly in the combination of a horizontal rotary disk with a hood arranged above it, heating-means provided below it, and a scraper arranged within the hood and upon the disk. The substance to be coked is conducted to and upon the disk in such a manner that it forms an annular layer which is rotated by means of, and together with, the rotating disk, the speed of which is such that the material carried round is semi-coked during one revolution, the semi-coking being completed when the material arrives at the scraper in order to be conducted off the disk and out of the apparatus. The substance to be treated forms a thin layer upon the rotary disk, and the rim of this latter which carries that layer is heated from below, as is more fully described hereinafter in connection with the drawing.

The novel construction of the apparatus for semi-coking coal etc. and the novel manner of working made possible by it, offer several advantages. First of all, the material to be semi-coked does not stick fast to the heated surface and does not agglomerate in itself, so that no interruption of the procedure by reason of such occurrences takes place and consequently, a continuous service is warranted. The expenditure of power is very small, the wear and tear of the working parts is diminished to a minimum, and no dust is produced because the coal or other substance under treatment is at rest whilst being carried round over the furnace or other heating means. Also the saving of time resulting from the novel construction and manner of working is valuable, furthermore the smallness of the space required, the more, as a plurality of the rotary disks may be arranged one above the other or others.

In order to make my invention more clear, I refer to the accompanying drawing which shows by way of example a form of construction of the apparatus having but one rotary disk and a furnace below it, and in which Figure 1 is a vertical section through this apparatus and Figure 2 is a plan of the parts visible after the hood has been removed.

The rotary disk $a$ is affixed to the upper end of a vertical shaft arranged below its centre and driven by any suitable means with such a speed as appropriate to the purpose. Above the disk $a$ is a hood carrying a shaft-like tube serving for conducting the material to be treated to the disk. The lower end of the shaft or tube terminates shortly above the upper surface of said disk so that the material carried away upon the disk forms a thin annular layer, the thickness of which depends upon the distance of the lower edge of the shaft or tube from the disk.

Below the disk $a$ is, in the example shown, a furnace, preferably of circular or annular shape, having an annular heating channel $h$ located below the rim of the disk $a$. The hot gases coming from any source are led through the channel so as to heat especially the rim of the disk $a$.

The space above the disk is closed by a liquid metal-seal formed by an annular basin supported by the outer part of the furnace and containing a suitable metal such as tin or lead when in their molten state. The rim of the hood $e$ dips into the metal $f$, as does also a flange $d$ attached to the lower surface of the disk $a$. The annular basin is not completely closed, but interrupted by a passage $i$ through which the material treated is led out of the apparatus. The passage $i$ lies close to the shaft or tube $b$, in front of it with respect to the direction of rotation of the disk, and radially inwards from it is a scraper $c$, the lower edge of which is in contact with the upper surface of the disk and scrapes the material treated off the disk and conducts it to and through the passage $i$ before the fresh material is fed upon the disk through the shaft or tube $b$.

The vapors or gases arising during the coking operation are collected in the hood $e$ and sucked off in known manner and by known means through the pipe $g$.

Having now described my invention, what I desire to secure by a Patent of the United States is:

1. An apparatus of the character described comprising in combination a horizontally arranged disk, means for housing said disk, means for rotating said disk, an annular heating channel arranged below said disk whereby heat may be applied directly to the lower face of said disk and a feeding tube arranged above said disk substantially as and for the purpose specified.

2. An apparatus for semi-coking coal, slate and other bituminous substances, comprising in combination a rotary disk, a hood for completely housing the upper face of said disk, means for supplying heat directly to the lower face of said disk, a feeding tube extending through said hood and terminating in spaced relation to the upper face of said disk, and an outlet leading from the central portion of the hood, substantially as and for the purpose specified.

3. An apparatus for semi-coking coal, slate and other bituminous substances, comprising, in combination, a rotary disk, a hood for completely housing the upper face of said disk, a furnace arranged below said disk, an annular heating channel communicating with said furnace whereby the heat arising therein will be directed to the lower face of said disk, a feeding tube arranged adjacent the periphery of said disk and a scraper arranged adjacent said feeding tube and adapted to rest upon the upper face of said disk substantially as and for the purpose specified.

4. An apparatus for semi-coking coal, slate and other bituminous substances, comprising, in combination, a furnace, an annular heating channel arranged in said furnace, a horizontally arranged disk positioned above said furnace whereby the outer periphery thereof will extend above said annular heating channel, an annular basin arranged above said furnace containing a molten metal, a flange formed with said disk and adapted to extend within the molten metal in said basin, a hood extending over said disk, a rim formed with said hood and adapted to extend within the metal arranged in said basin, a feeding tube extending through said hood and terminating adjacent the upper face of said disk, and a scraper arranged upon the upper face of said disk substantially as and for the purpose specified.

In testimony whereof I affix my signature in presence of two witnesses.

KARL PRINZ ZU LÖWENSTEIN.

Witnesses:
   EMIL STEIN,
   A. POHL.